United States Patent [19]

Kosuge et al.

[11] Patent Number: 4,719,563
[45] Date of Patent: Jan. 12, 1988

[54] DATA TRANSMISSION CONTROL DEVICE FOR CONTROLLING TRANSFER OF LARGE AMOUNTS OF DATA BETWEEN TWO MEMORY UNITS

[75] Inventors: Hiroshi Kosuge; Yoshio Kiriu; Junichi Taguri, all of Hadano, Japan

[73] Assignee: Hitachi, Ltd., Tokyo, Japan

[21] Appl. No.: 684,293

[22] Filed: Dec. 20, 1984

[30] Foreign Application Priority Data

Dec. 23, 1983 [JP] Japan ................................. 58-241957

[51] Int. Cl.[4] ...................... G06F 13/00; G06F 12/06
[52] U.S. Cl. ................................................. 364/200
[58] Field of Search .................. 364/200 MS, 900 MS

[56] References Cited

U.S. PATENT DOCUMENTS

| | | | |
|---|---|---|---|
| 4,040,027 | 8/1977 | Van Es et al. ........................ | 364/900 |
| 4,103,334 | 7/1978 | Kashio .................................. | 364/900 |
| 4,122,531 | 10/1978 | Tamaru et al. ....................... | 364/900 |
| 4,197,588 | 4/1980 | Cason et al. ......................... | 364/900 |

Primary Examiner—Raulfe B. Zache
Assistant Examiner—William G. Niessen
Attorney, Agent, or Firm—Antonelli, Terry & Wands

[57] ABSTRACT

A data transmission control device for controlling the data transfer between two memory means on the basis of an instruction from a processor is disclosed in which the instruction from the processor is decoded, a transfer request is issued to each memory means a plurality of times, depending upon a transfer unit indicated by the decoded instruction and an access unit of each memory means, a data buffer is provided between the memory means to temporarily store data whichis transferred from one of the memory means to the other memory means, and the issue of a transfer request to each memory means is allowed or stopped in accordance with the quantity of data stored in the data buffer.

7 Claims, 8 Drawing Figures

DATA TRANSMISSION CONTROL DEVICE FOR CONTROLLING TRANSFER OF LARGE AMOUNTS OF DATA BETWEEN TWO MEMORY UNITS

BACKGROUND OF THE INVENTION

The present invention relates to a data transmission control device, and more particularly to a data transmission control device suited for controlling the transmission of a large amount of data between two memory means.

One of the serious problems with respect to use of an external memory in of a computer system is that data transfer with the external memory is performed at low speed. The use of a semiconductor memory as the external memory may be effective to solve the above problem. However, if data is transferred between semiconductor memories through an input/output processor, the transfer speed will be limited by the transfer capability of the input/output processor. In more detail, the input/output processor reads out data from a specified external memory, for example, byte by byte, irrespective of the access unit thereof, and writes the data in another external memory in accordance with the access unit thereof. That is, when data in the high-speed memory is transferred to another memory, the speed of data transfer is determined by the transfer speed of the input/output processor. Accordingly, in the case where data transmission between high-speed semiconductor memories is controlled by an input/output processor, it is impossible to fully utilize the high-speed capability of each semiconductor memory.

In some cases, however, data transfer between semiconductor memories is carried out without using any input/output processor. The data transfer between a main memory and a buffer memory is an example of such data transfer. The buffer memory is required to rapidly respond to each of the data read-out requests from a central processor. The data stored in the buffer memory represents copies of data which are scattered in the main memory, and therefore there is little probability that a plurality of transfer unit data (namely, a plurality of unit data each indicating the, access unit of the buffer memory) in the buffer memory will be processed together. Thus, it is required to transfer only one transfer unit data at a time, and the transfer unit data can be transferred at high speed. However, a data transmission control device used in this case receives only an instruction for one transfer unit data, from the central processor, and does not have a function of decomposing an original instruction for transferring a large amount of data into a plurality of transfer instructions each requiring the transfer of unit data, which is the processing unit of the data transmission control device. Accordingly, the above system is not suited for the transmission of a large amount of data. However, if it is desired to transmit a large amount of data by the above system, it will be required to decompose the original instruction for a large amount of data by the central processor itself into a plurality of transfer instructions each requiring the transfer of unit data, and thus a heavy burden will be cast on the central processor.

SUMMARY OF THE INVENTION

An object of the present invention is to provide a data transmission control device which can transfer a large amount of data between two external memory means, while causing each external memory means to exhibit the maximum capability thereof.

In order to attain the above object, according to the present invention, there is provided a data transmission control device, in which a single instruction supplied from a processor and requiring the transfer of a large amount of data between two external memory means is decomposed into a plurality of requests each requiring the transfer of unit data suited for the capability of each external memory, and the requests thus formed are issued to each external memory.

DESCRIPTION OF THE PREFERRED EMBODIMENT

Figure 1:
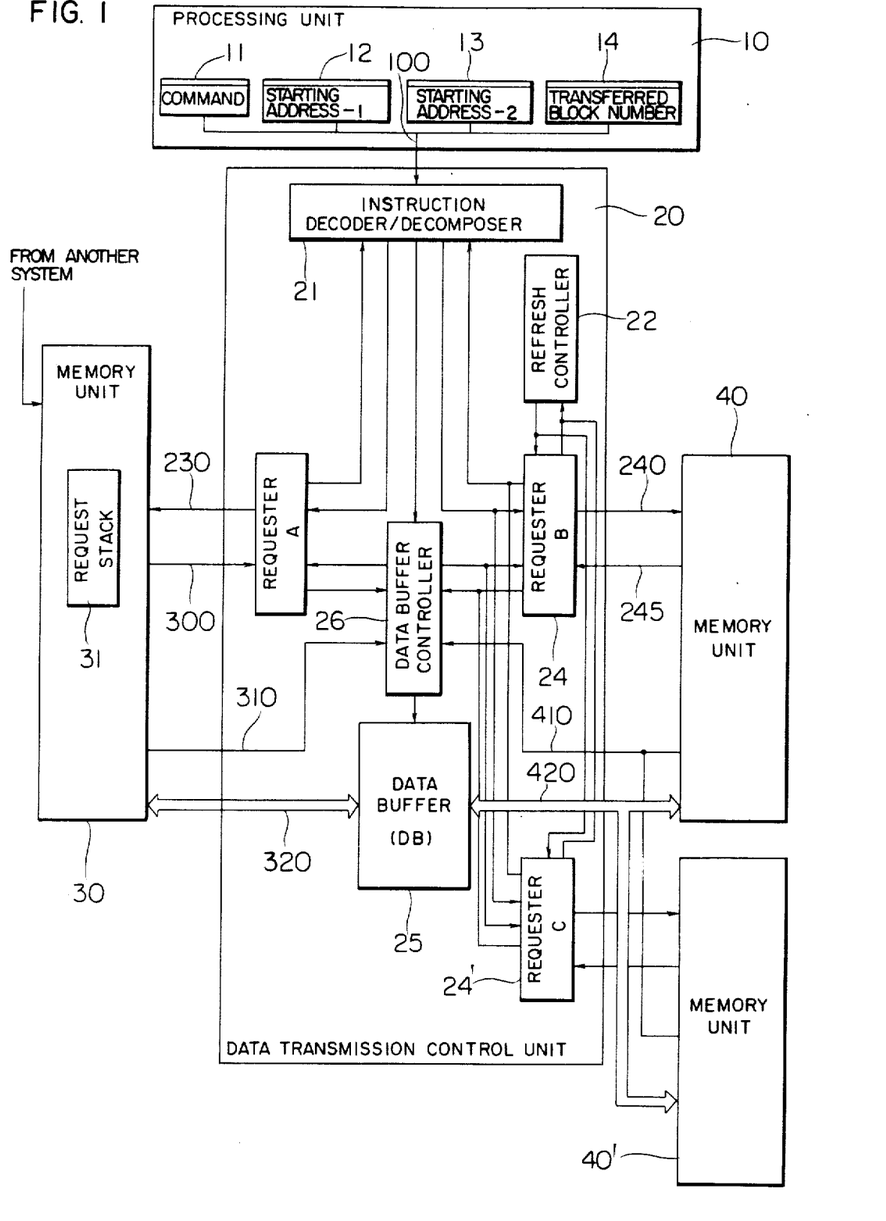
FIG. 1 is a block diagram showing the whole construction of an embodiment of a data transmission control system according to the present invention.

First, explanation will be made on the whole construction of an embodiment of a data transmission control system according to the present invention, with reference to FIG. 1.

An instruction which is issued from a processing unit 10 to a data transmission control unit 20 includes a transfer direction command 11, an address 12 indicating the location of a first transferred block in a memory unit 30, an address 13 indicating the location of the first transferred block in a memory unit 40, and the number 14 of blocks to be transferred. A block which is indicated by the instruction from the processing unit 10 has 256 bytes, by way of example. Further, an input/output unit (not shown) is connected to the processing unit 10, in addition to the data transmission control unit 20, and other memory units such as a magnetic disc are connected to the input/output unit. Now, let us suppose that the memory unit 30 is a main memory, that a data transfer request (hereinafter simply referred to as "request") to the memory unit 30 requires the transfer of, for example, 8 bytes, and that the memory unit 30 can process one request, for example, in a unit period, namely, a machine cycle (hereinafter referred to as "MC"). A similar request is issued from devices other than a requester-A 23 of the data transmission control unit 20, to the memory unit 30. Thus, requests issued to the memory unit 30 compete with each other, and are put in a waiting state. Accordingly, the memory unit 30 includes a request stack 31 for temporarily holding the requests. The memory unit 40 is formed of, for example, a semiconductor memory, and the request to the memory unit 40 requires the transfer of, for example, 64 bytes. Accordingly, the memory unit 40 can process one request, for example, in 8 MC. Requests to the memory unit 40 other than a refresh request are issued only from a requester-B 24 of the data transmission control unit 20. The memory unit 40 can process the refresh request, for example, in 4 MC. Further, a memory unit 40' is formed of a semiconductor memory different from that of the memory unit 40, and a request to the memory unit 40' is issued from a requester-C 24'. That is, each of the requesters 23, 24 and 24' is provided, to issue a request suited for a corresponding one of the memory units 30, 40 and 40'.

Next, explanation will be made of the construction of the data transmission control unit 20. An instruction decoder/decomposer 21 decodes an instruction from the processing unit 10, decomposes the instruction into a plurality of transfer instructions each requiring the transfer of one block, and sends the transfer instructions to the requester-A 23 and requester-B 24. A refresh controller 22 generates a refresh request to the memory unit 40, at a predetermined interval. A data buffer 25 temporarily holds data in the course of data transmission. A data buffer controller 26 controls the write-in and read-out operations for the data buffer 25.

When applied with a one-block transfer instruction from the instruction decoder/decomposer 21, the requester-A 23 issues an 8-byte request (namely, the request for transferring 8 bytes) to the memory unit 30 thirty-two times. Similarly, when applied with the one-block transfer instruction from the data decoder/decomposer 21, the requester-B 24 issues a 64-byte request (namely, the request for transferring 64 bytes) to the memory unit 40 four times. Further, the requester-B 24 transmits a refresh request from the refresh controller 22, to the memory unit 40.

Next, explanation will be made on the control of data transmission from the memory unit 30 to the memory unit 40, with reference to FIGS. 1 to 8.

Figure 2:
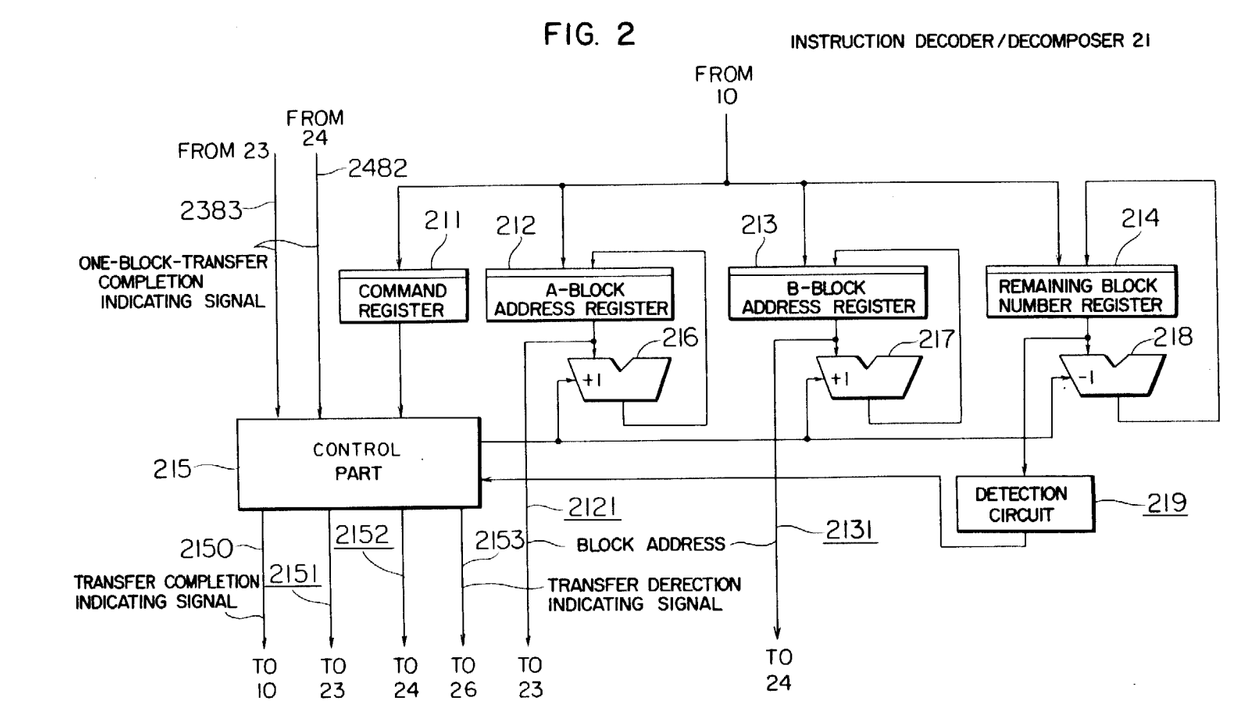
FIG. 2 is a block diagram showing the instruction decoder/decomposer 21 of FIG. 1.

FIG. 2 shows the construction of the data decoder/decomposer 21. Referring to FIG. 2, when a data transfer instruction from the processing unit 10 is supplied to the instruction decoder/decomposer 21, the transfer direction command 11, the address 12 indicating the location of a first transferred block in the memory unit 30, the address 13 indicating the location of the first transferred block in the memory unit 40, and the number 14 of blocks to be transferred, which are all included in the above instruction, are set in a command register 211, an A-block address register 212, a B-block address register 213, and a remaining block number register 214, respectively. A control part 215 decodes the command set in the command register 211. In the case where data is transferred from the memory unit 30 to the memory unit 40, the control part 215 issues a one-block read-out instruction to the requester-A 23 through a line 2151. Simultaneously with the above operation, the block address 12 in the memory unit 30 is sent from the A-block address register 212 to the requester-A 23 through a line 2121. Further, the control part 215 issues a one-block write-in instruction to the requester-B 24 through a line 2152, and simultaneously the block address 13 in the memory unit 40 is sent from the B-block address register 213 to the requester-B 24 through a line 2131.

The control part 215 informs the data buffer controller 26 of the transfer direction, through a line 2153. After the requester-A 23 and requester-B 24 have issued the one-block read-out instruction and one-block write-in instruction, respectively, the contents of each of the A-block address register 212 and B-block address register 213 are incremented by one with the aid of adders 216 and 217, and the contents of the remaining block number register 214 are decremented by one with the aid of a subtracter 218.

Now, the control operation of the control part 215 which is included in the instruction decoder/decomposer 21, will be explained below, on the basis of a flow chart shown in FIG. 6. When an instruction from the processing unit 10 is supplied to the instruction decoder/decomposer 21, the control part 215 judges whether the number of to-be-transferred blocks is equal to zero or not, on the basis of the output signal of a detection circuit 219 (step 101). When the above number is zero, the control part 215 informs the processing unit 10 that a data transfer operation has been completed, through a line 2150 (step 102). When the above number is not equal to zero, the transfer direction is judged on the basis of the contents of the command register 211 (step 103). When it is judged that data is transferred from the memory unit 30 to the memory unit 40, the control part 215 issues a one-block read-out instruction to the requester-A 23 through the line 2151, issues a one-block write-in instruction to the requester-B 24 through the line 2152, and informs the data buffer controller 26 of the transfer direction through the line 2153 (step 104). Next, a count signal is sent from the control part 215 to each of the A-block address register 212, B-block address register 213 and remaining block number register 214 (step 104). Then, the control part 215 is put in a waiting state till each of the requester-A 23 and requester-B 24 informs the control part 215 that the transfer of one block has been completed (steps 106 and 107). While, in the case where it is judged that data is transferred from the memory unit 40 to the memory unit 30, the same control operation as in the case where data is transferred from the memory unit 30 to the memory unit 40, is performed, except that the control part 215 issues a one-block write-in instruction to the requester-A 23, and issues a one-block read-out instruction to the requester-B 24 (steps 105, 108 and 109). When both of the requester-A 23 and requester-B 24 inform the control part 215 which is put in the waiting state, that the transfer of one block has been completed, the control part 215 again judges whether the number of to-be-transferred blocks is equal to zero or not (step 101). The above control operation is repeated till the number of to-be-transferred blocks is reduced to zero.

Figure 3:
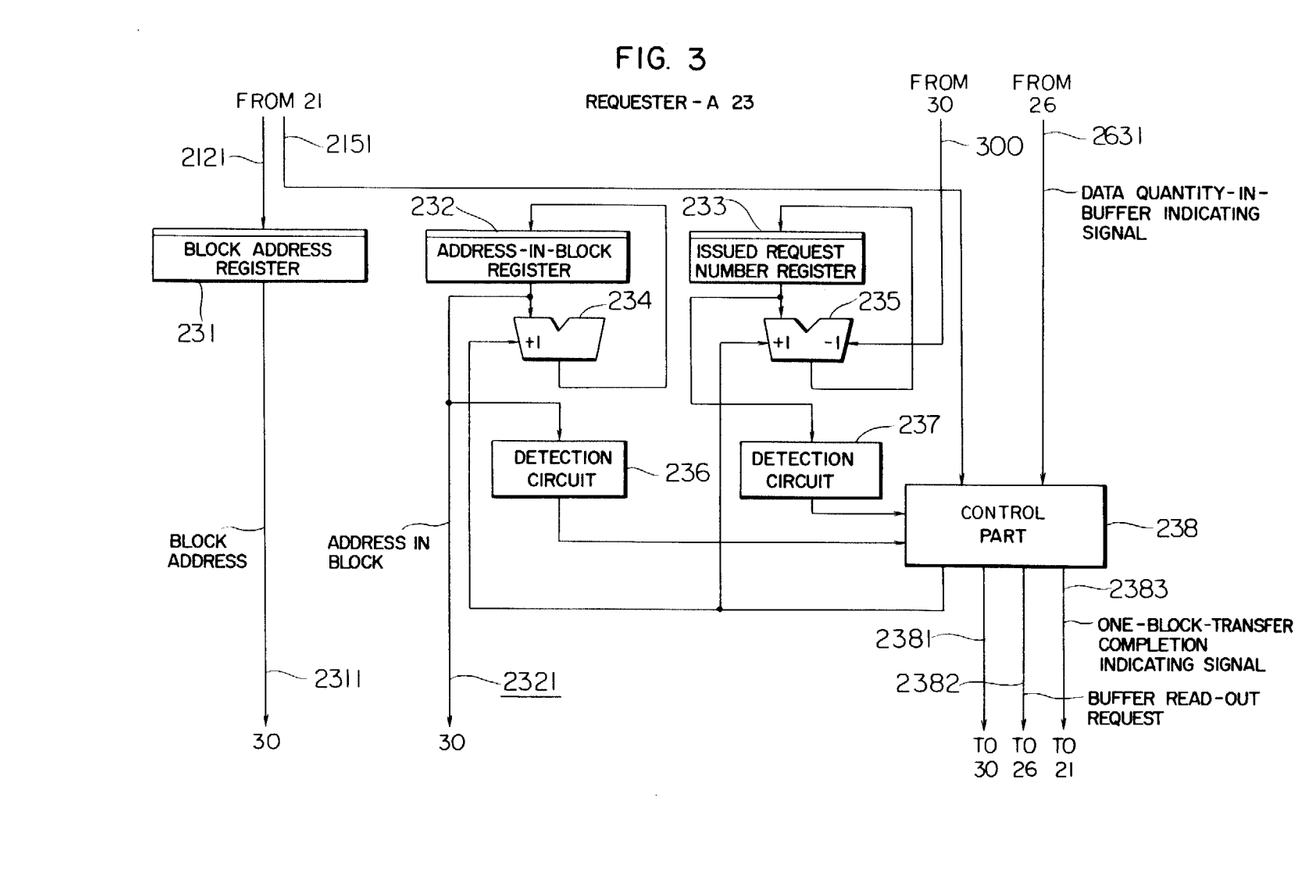
FIG. 3 is a block diagram showing the requester-A 23 of FIG. 1.

FIG. 3 shows the construction of the requester-A 23. On receiving a one-block read-out instruction from the instruction decoder/decomposer 21, a control part 238 of the requester-A 23 sends the block address 12 in the memory unit 30 which is supplied from the instruction decoder/decomposer 21 and set in a block address register 231, to the memory unit 30 through a line 2311, sends addresses which indicate the positions at every 8 bytes in the block and are produced by an address-in-block register 232 and an adder 234, to the memory unit 30 through a line 2321, and issues an 8-byte read-out request to the memory unit 30 through a line 2381, thirty-two times at intervals of 1 MC, since the requester-A 23 has received the one-block read-out instruction from the instruction decoder/decomposer 21. However, in the case where the data buffer controller 26 has informed the control part 238 that the data buffer 25 has no empty space, through a line 2631, or in the case where a signal 300 which is sent out from the memory unit 30 in response to the read-out request, indicates that the request stack 31 of the memory unit 30 has no empty space, the issue of the read-out request is temporarily stopped. The contents of an issued request number register 233 are incremented by one when one request is issued to the memory unit 30, and decremented by one when the above response from the memory unit 30 is received by an adder-subtracter 235. Further, when a detection circuit 237 detects that the contents of the issued request number register 233 coincide with the maximum number of requests which can be held in the request stack 31, the issue of the read-out request is temprarily stopped. When a detection circuit 236 detects that the read-out request has been issued thirty-two times, the control part 238 informs the instruction decoder/decomposer 21 that the transfer of one block has been completed, through a line 2383.

Figure 4:
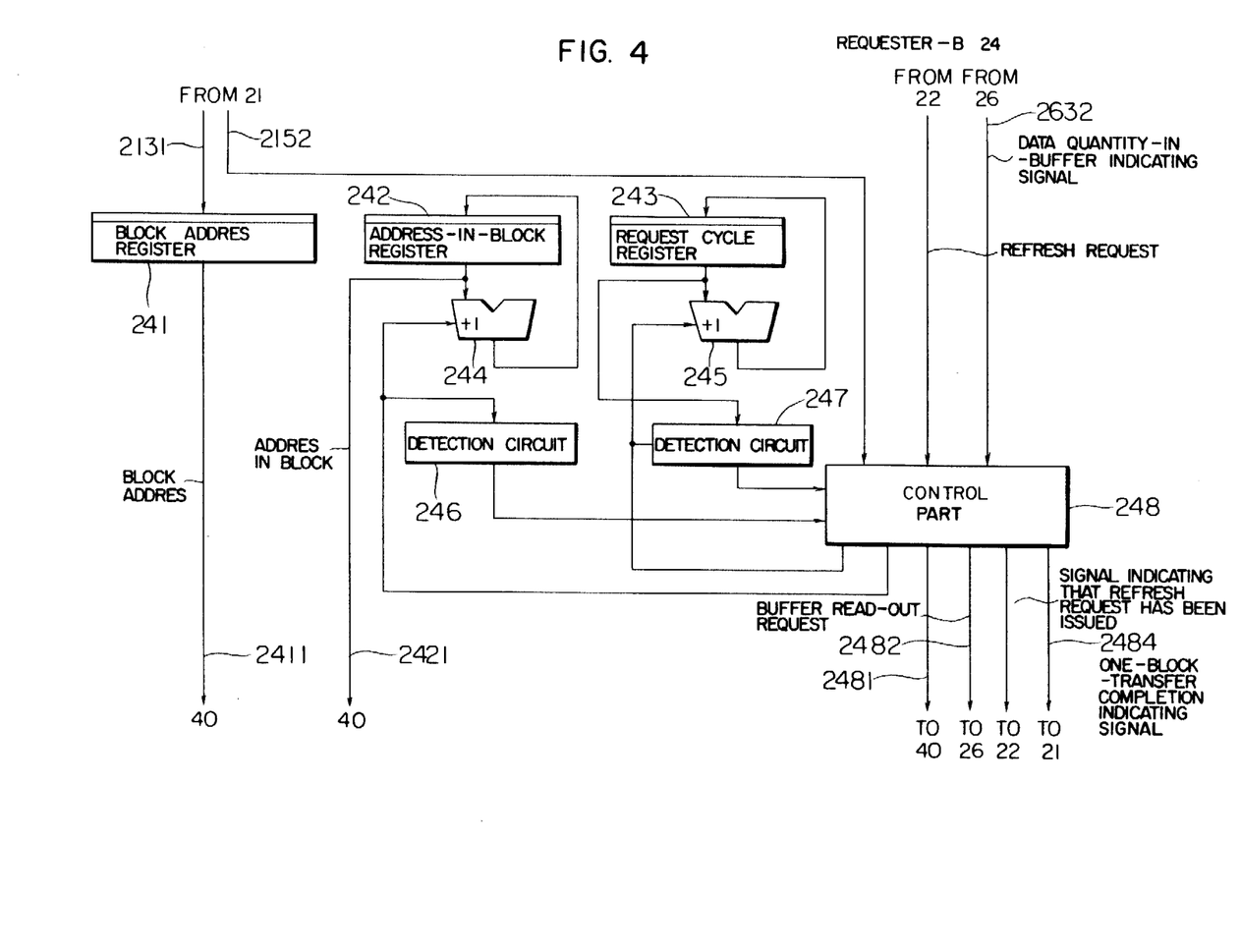
FIG. 4 is a block diagram showing the requester-B 24 of FIG. 1.

The requester-A 23 issues the read-out request at an interval of 1 MC, and therefore is not required to have circuit parts such as a request cycle register 243, an adder 245 and a detection circuit 247 which are included in the requester-B 24.

Upon receiving an 8-byte read-out request from the requester-A 23, the memory unit 30 sends out the response signal 300, and performs a read-out operation. When the read-out operation is completed, the data thus read out is delivered on a data line 320, and a data sent-out signal 310 is sent to the data buffer controller 26.

Figure 7:
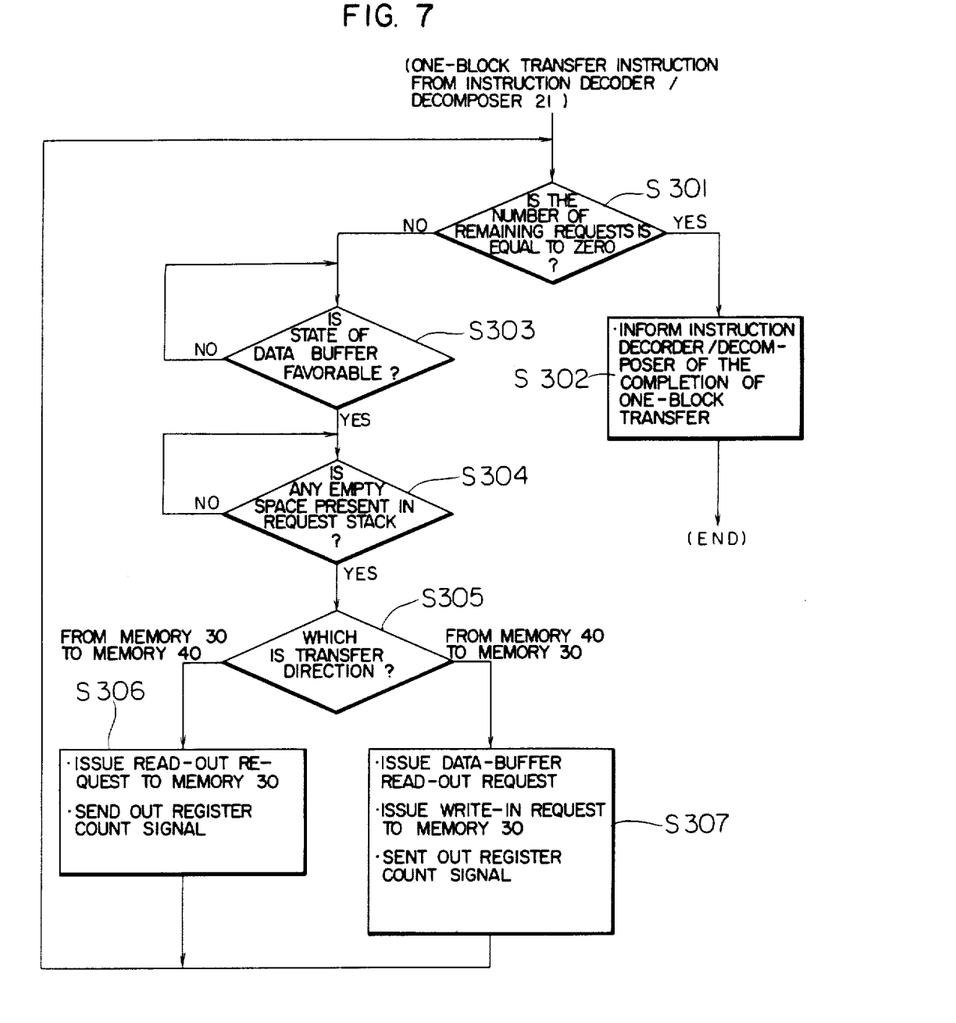
FIG. 7 is a flow chart for explaining the control operation of the control part 238 included in the requester-A 23.

The control operation of the control part 238 included in the requester-A 23 will be explained below, on the basis of a flow chart shown in FIG. 7.

On receiving a one-block transfer instruction from the instruction decoder/decomposer 21, the control part 238 judges whether the number of remaining requests is zero or not, on the basis of the output signal of the detection circuit 236 for detecting that a request has been issued thirty-two times (step 301). In the case where the above number is not equal to zero, it is judged whether the state of the data buffer 25 permits data transfer or not, on the basis of a data quantity-in-buffer indicating signal which is sent from the data buffer controller 26 to the control part 238 through the line 2631 (step 303), and it is judged whether the request stack has an empty space or not, on the basis of the output signal of the detection circuit 237 for detecting the empty space of the request stack 31 (step 304). When at least one of the condition that the state of the data buffer 25 permits data transfer, and the condition that the request stack 31 has an empty space, is not satisfied, the issue of a request is temporarily stopped. When both of the above conditions are satisfied, the transfer direction is judged in step 305. Then, a data buffer read-out request is issued to the data buffer controller 26 through a line 2382, and/or a request is issued to the memory unit 30 through the line 2381, in accordance with the transfer direction. Further, a count signal is sent to the address-in-block register 232 and the issued request number register 233 (step 306 or 307). The above control operation is repeated thirty-two times. Thus, the detection circuit 236 informs the control part 238 that the number of remaining requests is zero (step 301). Then, the control part 238 informs the instruction decoder/decomposer 21 that the transfer of one block has been completed, through the line 2383 (step 302).

Figure 5:
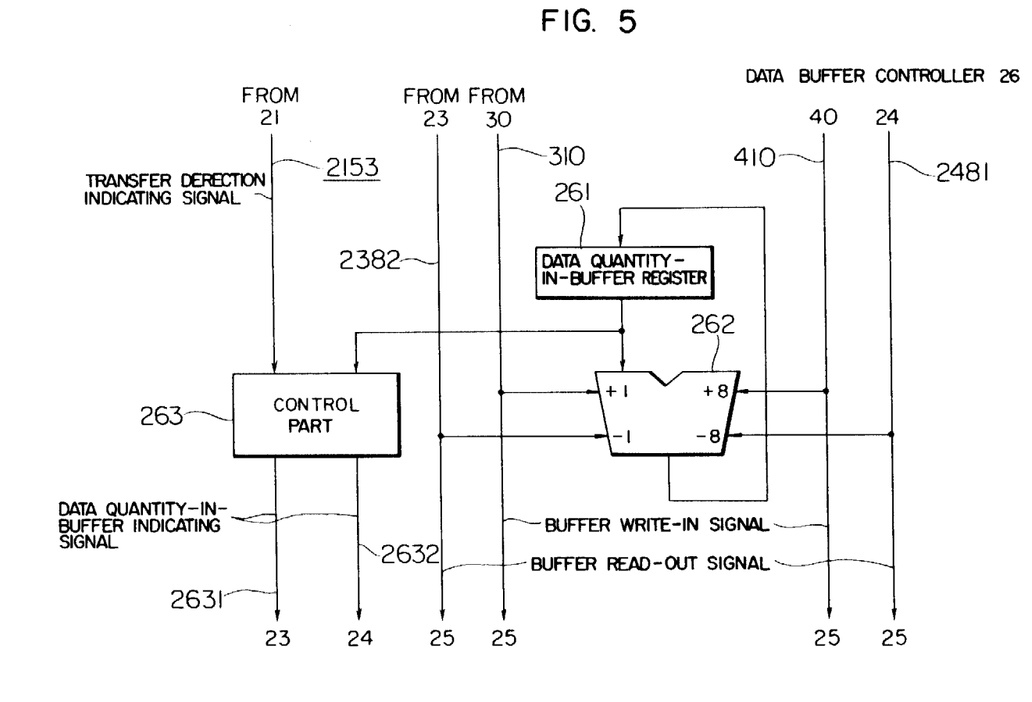
FIG. 5 is a block diagram showing the data buffer controller 26 of FIG. 1.

FIG. 5 shows the construction of the data buffer controller 26. Referring to FIG. 5, the controller 26 is informed of the transfer direction by a transfer direction indicating signal which is supplied from the instruction decoder/decomposer 21 to a control part 263 through a line 2153. On receiving the data send-out signal 310 from the memory unit 30, the controller 26 writes data which has been read out of the memory unit 30, in the data buffer 25, increments the contents of a data quantity-in-buffer register 261 by one, and informs the requester-A 23 and requester-B 24 that data held in the data buffer 25 has been increased, through lines 2631 and 2632.

The control part 263 of the data buffer/controller 26 instructs the requester-A 23 and requester-B 24 to stop the data transfer, when conditions shown in the following table I hold. These conditions are dependent on the transfer direction which is given from the instruction decoder/decomposer 21 through the line 2153, and the contents of the data quantity-in-buffer register 261 for counting the data quantity in the data buffer 25. In the following table I, conditions ② and ③ indicate that data transfer is inhibited for the reason that data to be transferred is not stored in the data buffer 25, and conditions ① and ④ indicate that data transfer is inhibited for the reason that the data buffer 25 does not have any space for admitting to-be-transferred data.

TABLE I

| transfer direction | from memory unit 30 to memory unit 40 | from memory unit 40 to memory unit 30 |
|---|---|---|
| send a transfer inhibiting signal to requester-A through line 2631 | ① $X > M - \alpha_1$ | ② $X = 0$ |
| send a transfer inhibiting signal to requester-B through line 2632 | ③ $X \leq 8$ | ④ $X > M - \alpha_2$ |

In the table I, reference character X indicates the contents of the data quantity-in-buffer register 261, M a maximum data quantity which can be held in the data buffer 25 and $\alpha_1$ and $\alpha_2$ are constants representing margins of the buffer.

FIG. 4 shows the construction of the requester-B 24. On receiving a one-block write-in instruction from the instruction decoder/decomposer 21, a control part 248 of the requester-B 24 sends the block address 13 in the memory unit 40 which is supplied from the instruction decoder/decomposer 21 and set in a block address register 241, to the memory unit 40 through a line 2411, sends addresses which indicate the positions at every 64 bytes in the block and are produced by an address-in-block register 242 and an adder 244, to the memory unit 40 through a line 2421, and issues a 64-byte write-in request to the memory unit 40 through a line 2481, four times at intervals of 8 MC, since the requester-B 24 has received the one-block write-in instruction. However, in the case where the data buffer controller 26 has informed the control part 248 that data to be transferred is not stored in the data buffer 25, through a line 2632, or in the case where the control part 248 receives a refresh request from the refresh controller 22, the control part 248 issues a refresh request to the memory unit 40, and then the issue of the write-in request is stopped for a predetermined period. When the write-in request or refresh request is issued to the memory unit 40, the contents of a request cycle register 243 are incremented by one at an interval of 1 MC. The issue of the next write-in or refresh request is inhibited till a detection circuit 247 detects that 8 MC has elapsed after a write-in request was issued, or 4 MC has elapsed after a refresh request was issued. The control part 248 of the requester-B 24 requires the data buffer controller 26 to read out data from the data buffer 25, each time the write-in request is issued to the memory unit 40 through the line 2481. The above requirement is sent to the data buffer controller 26 through a line 2482. When a detection circuit 246 detects that the write-in request has been issued four times, the requester-B 24 informs the instruction decoder/decomposer 21 that the transfer of one block has been completed, through a line 2484. Unlike the memory unit 30, the memory unit 40 does not include a request stack. Accordingly, the requester-B 24 does not necessitate circuit parts such as the issued request number register 233, adder-subtracter 235 and detection circuit 237 which are included in the requester-A 23.

Figure 8:
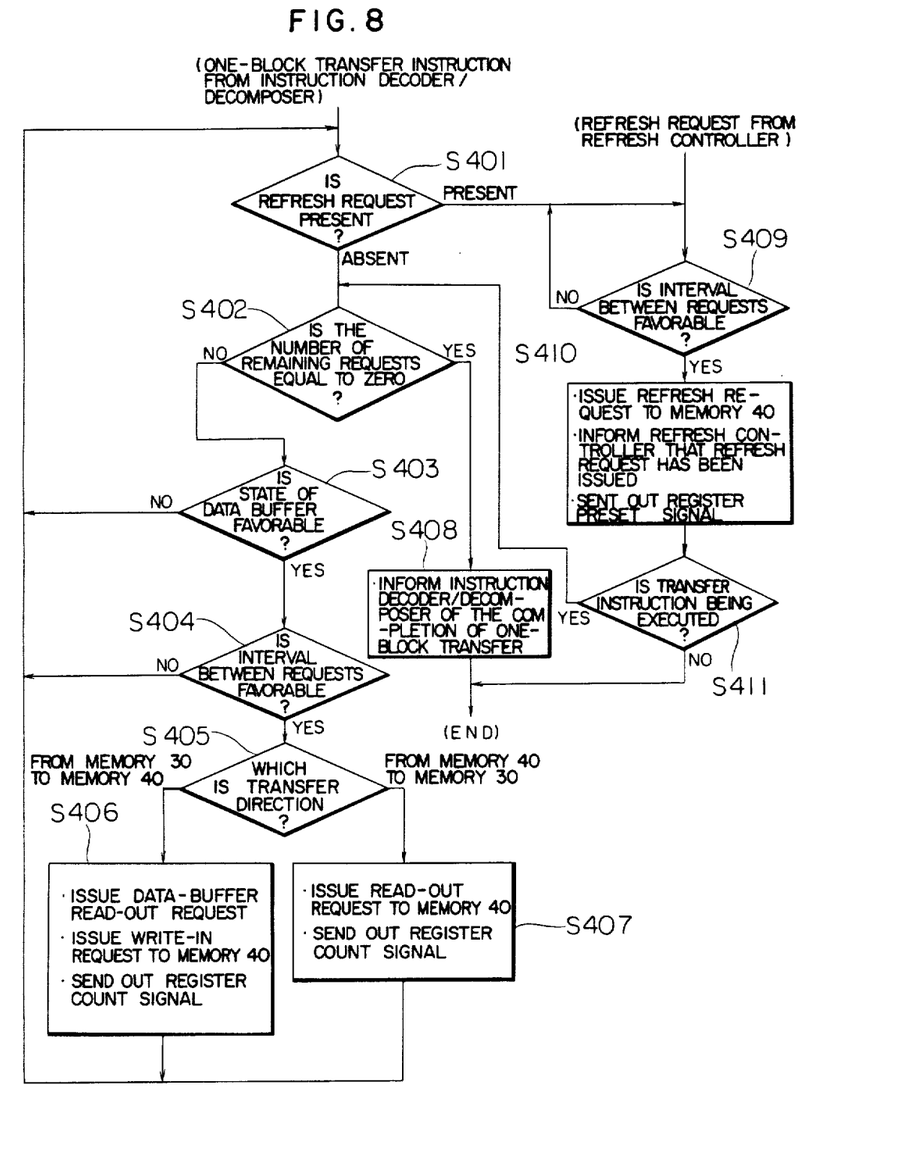
FIG. 8 is a flow chart for explaining the control operation of the control part 248 included in the requester-B 24.

Next, the control operation of the control part 248 included in the requester-B 24 will be explained below, on the basis of a flow chart shown in FIG. 8.

Upon receiving a one-block transfer instruction from the instruction decoder/decomposer 21, the control part 248 judges whether a refresh request from the refresh controller 22 is present or not (step 401). When the refresh request is absent, it is judged whether the number of remaining requests is equal to zero or not, on the basis of the output of the detection circuit 246 for detecting that a transfer request has been issued four times (step 402). When the above number is not equal to zero, it is judged whether the state of the data buffer 25 permits data transfer or not, on the basis of a data quantity-in-buffer indicating signal which is sent from the data buffer controller 26 to the control part 248 through the line 2632 (step 403), and it is judged whether a time which has elapsed after the preceding request was issued, exceeds a predetermined time or not, on the basis of the output of the detection circuit 247 for detecting a time having elapsed after the issue of a request (step 404). When at least one condition that the state of the data buffer 25 permits data transfer, and the condition that a time having elapsed after the issue of the preceding request exceeds the predetermined time, is not satisfied, the issue of a request is stopped. When both of the above conditions are satisfied, the transfer direction is judged in step 405. Then, a data-buffer read-out request is issued to the data buffer controller 26 through the line 2482, and/or a request is issued to the memory unit 40 through the line 2481, in accordance with the transfer direction. Further, a count signal and a preset signal are sent to the address-in-block register 242 and request cycle register 243, respectively (step 406 or 407). The above control operation is repeated four times. Thus, the detection circuit 246 informs the control part 248 that the number of remaining requests is zero (step 402). Then, the control part 248 informs the instruction decoder/decomposer 21 that the transfer of one block has been completed, through the line 2484 (step 408).

When a refresh request from the refresh controller 22 is supplied to the control part 248, the control part 248 ascertains that the predetermined time has elapsed after the preceding request was issued (step 409). Then, the control part 248 issues a refresh request to the memory unit 40 through the line 2481, informs the refresh controller 22 that the refresh request has been issued to the memory unit 40, and sends a preset signal to the request cycle register 243 (step 410). Next, it is checked whether the one-block transfer instruction is being executed or not (step 411). If the instruction is being executed, the processing in the steps 402 to 410 will be carried out. If the instruction is not being executed, the control operation will terminate. In order to preferentially process a refresh request which is issued in a period when the one-block transfer instruction is being executed, the control part 248 always checks the presence or absence of a refresh request, in a period when the issue of a request is inhibited for the reason that the data quantity in the data buffer 25 is unfavorable, or the reason that the predetermined time has not elapsed after the preceding request was issued (step 401).

Figure 6:
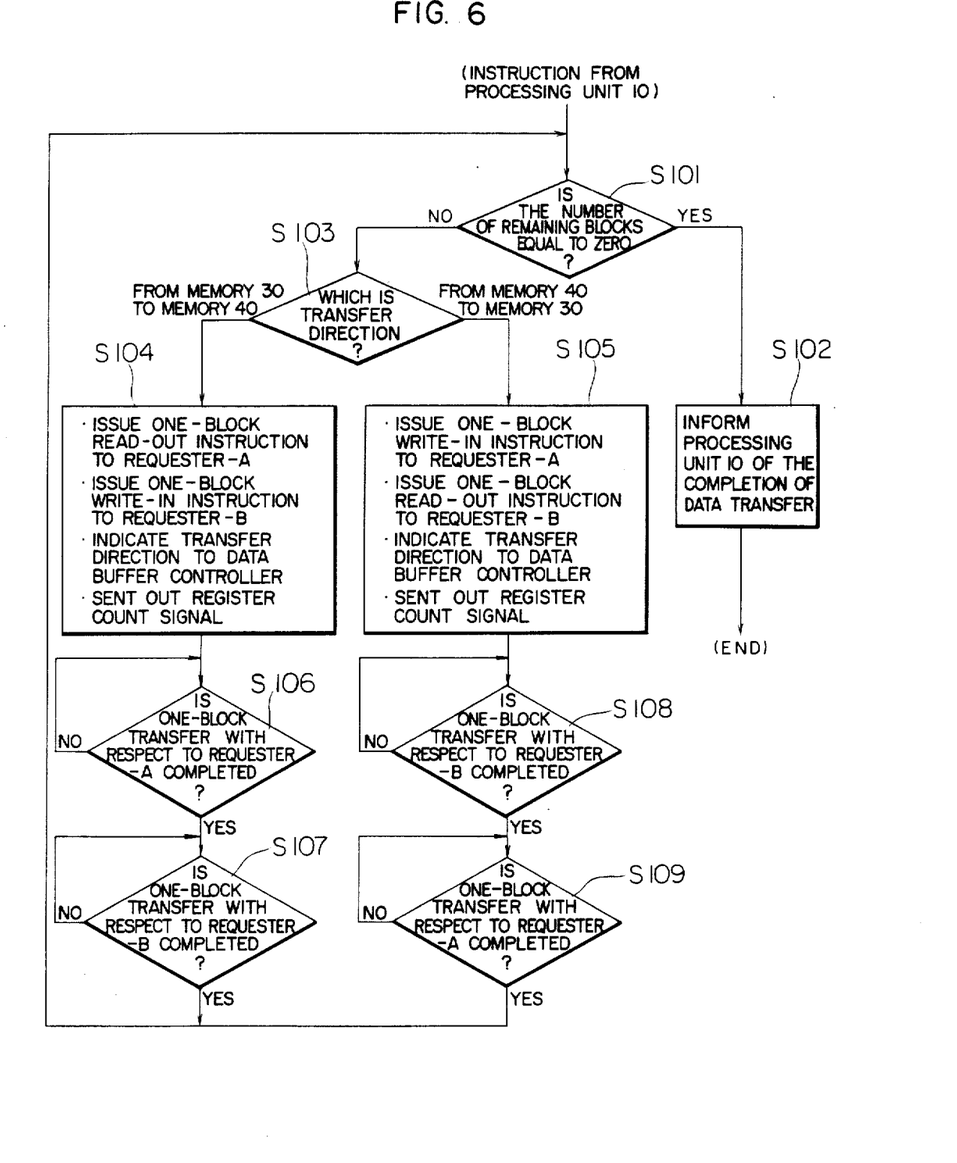
FIG. 6 is a flow chart for explaining the control operation of the control part 215 included in the instruction decoder/decomposer 21.

Upon receiving a data-buffer read-out request from the requester-B 24, the data buffer controller 26 of FIG. 6 reads out data from the data buffer 25 on a first-in, first-out basis, and delivers the read-out data on a data line 420. Further, at this time, the controller 26 decrements the contents of the data quantity-in-buffer register 261 by eight, and informs the requester-A 23 and requester-B 24 that data in the data buffer 25 has been decreased, through the lines 2631 and 2632.

Upon receiving the write-in request from the requester-B 24, the memory unit 40 writes therein the data on the data line 420.

When the instruction decoder/decomposer 21 receives a one-block-transfer completion indicating signal from both of the requester-A 23 and requester-B 24, it is checked by the detection circuit 219 whether the number of remaining blocks is equal to zero or not. When the number of remaining blocks is not equal to zero, the above-mentioned control operation is again performed. When the above number is zero, the data transfer operation terminates, and the processing unit 10 is informed of the termination of the data transfer operation, through a line 2150.

In the above, explanation has been made on the control operation in the data transmission from the memory unit 30 to the memory unit 40. The control operation in the data transmission from the memory unit 40 to the memory unit 30 is different from the above control operation, as mentioned below. That is, an instruction from the processing unit 10 is decoded by the instruction decoder/decomposer 21, and thus it is known that the instruction is an instruction for transferring data from the memory unit 40 to the memory unit 30. Then, the instruction decoder/decomposer 21 issues a one-block readout instruction and a one-block write-in instruction to the requester-B 24 and requester-A 23, respectively, and informs the data buffer controller 26 of the above transfer direction.

On receiving the one-block read-out instruction from the instruction decocer/decomposer 21, the requester-B 24 issues a read-out request to the memory unit 40. However, in the case where the data buffer controller 26 has informed the requester-B 24 that an empty space is not present in the data buffer 25, the issue of the read-out request is stopped.

On receiving the read-out request from the requester-B 24, the memory unit 40 performs a read-out operation.

While, on receiving the one-block write-in instruction from the instruction decoder/decomposer 21, the requester-A 23 issues a write-in request to the memory unit 30. At this time, if the data buffer controller 26 informs the requester-A 23 that data to be transferred is not stored in the data buffer 25, the issue of the write-in request will be stopped.

On receiving the write-in request from the requester-A 23, the memory unit 30 carries out a write-in operation.

In the present embodiment, after having received the one-block-transfer completion indicating signal from both of the requester-A and requester-B, the instruction decoder/decomposer 21 issues the next one-block transfer instruction to the requester-A and requester-B. Accordingly, the issue of request to each memory unit is interrupted for a while. However, this problem can be solved by providing an instruction stack for accomodating one-block transfer instructions from the instruction decoder/decomposer 21, in each of the requester-A and requester-B.

According to the present embodiment, the requester-A 23 and requester-B 24 do not only issue a request to the memory units 30 and 40, respectively, but also decompose an instruction into a plurality of requests each using an access unit suited for each memory unit. Accordingly, the memory units 30 and 40 can exhibit their maximum capability.

Further, according to the present embodiment, specific logics or unit data instructions required for the processing unit 10 to connect with the memory units 30 and 40 can be provided locally in the requester-A 23 and requester-B 24 so that the control of the memory units 30 and 40 is readily carried out by the processing unit 10.

As has been explained in the foregoing, according to the present invention, the decomposition of an instruction into transfer requests is carried out in the data transmission control unit, and moreover the decomposition for one memory unit is independent of that for the other memory unit. Accordingly, transfer requests corresponding to respective transfer speeds of the memory units can be produced, and thus it is possible to transfer a large amount of data between the memory units, at high speed. Further, prior to the above decomposition of the instruction, an original instruction is decomposed into instructions (for example, one-block transfer instructions) each capable of being decomposed into transfer requests. Accordingly, the logics, which are otherwise required to be provided individually in the respective memory units, can be, collectively provided in a local unit. This facilitates the control of the memory units 30 and 40.

We claim:

1. A data transmission control device for controlling data transfer between first and second memory means based on a primary instruction provided by a processor and including information on a direction of data transfer between said first and second memory means, a data transfer starting address and information on an amount of data to be transferred, said device comprising:
   first means for decoding said primary instruction and issuing one or more transfer instructions, each transfer instruction causing transfer of one block of data, depending on the amount of data to be transferred as indicated by said decoded primary instruction;
   second means associated with said first memory means for receiving the transfer instructions issued by said first means, when said decoded primary instruction indicates data transfer from the first memory means to the second memory means, and for issuing to said first memory means, in response to each of the received transfer instructions, a first number of transfer requests sequentially, said first number being determined on the basis of a predetermined access unit of said first memory means which consists of the length of data aceessible by said first memory means for each of the transfer requests issued thereto and the amount of data in one block of data; and
   third means associated with said second memory means and connected to receive the transfer instructions issued by said first means, when said decoded instruction indicates data transfer from the second memory means to the first memory means, for issuing to said second memory means, in response to each of the received transfer instructions, a second number of transfer requests sequentiallly, said second number being determined on the basis of a predetermined access unit of said second memory means which consists of the length of data acessible by said second memory means for each of the transfer requests issued thereto and the amount of data in one block of data.

2. A device according to claim 1, further comprising:
   means provided in said first means for supplying to any of said second and third means, from which the data is to be transferred, an indication of an access starting address based on the data transfer starting address indicated by the decoded instruction each time one transfer instruction is applied to that memory means; and
   means provided in each of said second and third means for incrementing the access starting address indicated by said first means by a number corresponding to the one access unit of the associated memory means, each time when one access to that memory means is completed.

3. A device according to claim 2, further comprising:
   means provided in said first means for issuing a read-out instruction to said second means and write-in instruction to said third means when said decoded instruction indicates data transfer from said first memory means to said second memory means, while issuing the read-out instruction to said third means and the write-in instruction to said second means when the decoded instruction indicates data transfer from said second memory means to said first memory means; and
   means provided in each of said second and third means for performing a read-out operation and a write-in operation in response to the read-out instruction and the write-in instruction, respectively, issued thereto from said first means.

4. A device according to claim 3, further comprising:
   a data buffer capable of being accessed by any of said second and third means; and
   means provided in each of said second and third means for storing into said data buffer data read-out of the associated memory means in response to the read-out instruction issued thereto from said first means, and for writing in the associated memory means, in response to the write-in instruction issued thereto from said first means, the data stored in said data buffer.

5. A data transmission control device according to claim 1, wherein each of said first, second and third means is operated in accordance with a machine cycle during which each of said second and third means can issue one transfer request, and said third means issues a transfer request to said second memory means at intervals of a predetermined number of the machine cycles.

6. A data transmission control device according to claim 5, wherein said third means includes a second counter for counting up a number of the machine cycles, and said transfer request is issued to said second memory means each time said second counter counts a predetermined number of the machine cycles.

7. A data transmission control device according to claim 1, wherein said first memory means includes a stack for holding transfer requests, and said second means includes a first counter for counting the number of transfer requests held in said stack, and wherein said second means increments said first counter by one each time one transfer request is issued to said first memory means, and decrements said first counter by one each time said second means receives a response to the transfer request from said first memory means, and further said second means stops the issue of the transfer request to said first memory means, upon detecting that the contents of the first counter coincide with a predetermined maximum number of such transfer requests which can held in said stack.

* * * * *